United States Patent [19]

Shiell

[11] Patent Number: 5,864,697
[45] Date of Patent: Jan. 26, 1999

[54] MICROPROCESSOR USING COMBINED ACTUAL AND SPECULATIVE BRANCH HISTORY PREDICTION

[75] Inventor: Jonathan H. Shiell, Plano, Tex.

[73] Assignee: Texas Instruments Incorporated, Dallas, Tex.

[21] Appl. No.: 883,928

[22] Filed: Jun. 27, 1997

Related U.S. Application Data

[60] Provisional application No. 60/020,844 Jun. 28, 1996.
[51] Int. Cl.$^6$ .................................................. G06F 9/32
[52] U.S. Cl. ........................................................ 395/587
[58] Field of Search ............................................. 395/587

[56] References Cited

U.S. PATENT DOCUMENTS

| | | | |
|---|---|---|---|
| 5,367,703 | 11/1994 | Levitan | 395/587 |
| 5,454,117 | 9/1995 | Puziol et al. | 395/587 |
| 5,687,360 | 11/1997 | Chang | 395/587 |
| 5,742,805 | 4/1998 | Kulkanni et al. | 395/587 |
| 5,758,142 | 5/1998 | McFarling et al. | 395/587 |
| 5,758,143 | 5/1998 | Levitan | 395/587 |

FOREIGN PATENT DOCUMENTS

| | | |
|---|---|---|
| 2 285 526 | 12/1994 | United Kingdom . |
| 2 285 526 | 12/1995 | United Kingdom . |
| WO 94/27210 | 4/1994 | WIPO . |
| WO 94/27210 | 11/1994 | WIPO . |

*Primary Examiner*—William M. Treat
*Attorney, Agent, or Firm*—Rebecca Mapstone Lake; Robert D. Marshall; Richard L. Donaldson

[57] ABSTRACT

A pipelined microprocessor (10) and system (2) incorporating the same, utilizing combined actual branch history and speculative branch history to predict branches, is disclosed. The microprocessor (10) includes a branch target buffer, or BTB, (56) having a plurality of entries (63) that are associated with previously branching instructions. Each entry (63) has a tag field (TAG) for storing an identifier for its branching instruction based upon the logical address therefore, and a target field (TARGET) for storing the target address for the branching instruction if the branch is taken. Each entry (63) also includes a branch history field (BH), the most-recent bits of which are applied to a pattern history table, or PHT, (53) as an index thereto to retrieve a prediction for the branch. A count field (CT) is also provided with each entry (63), to count the number of positions in the branch history field (BH) that correspond to speculative history, such as may arise in closely-packed programs where multiple instances of the branching instruction are encountered before resolution of an earlier instance. Upon resolution of the branching instruction, correct predictions are indicated by decrementing the count field (CT) for its entry. Mispredictions are reflected in the BTB (56) by the corresponding entry having its count field (CT) reset to reflect that no speculative history remains, by shifting the branch history field (BH) downward, and by including the actual result of the mispredicted branch therein. This arrangement allows more actual branch history to be used in predicting the next instance of the branching instruction, while maintaining the storage requirements of the BTB (56) relatively low.

28 Claims, 4 Drawing Sheets

MICROPROCESSOR USING COMBINED ACTUAL AND SPECULATIVE BRANCH HISTORY PREDICTION

This application claims priority under 35 U.S.C. §119(e)(1) of provisional application number 60/020,844, filed Jun. 28, 1996.

This invention is in the field of microprocessor integrated circuits, and is more specifically directed to microprocessors with pipelined architecture.

BACKGROUND OF THE INVENTION

In the field of microprocessors and other programmable logic devices, many improvements have been made in recent years which have resulted in significant performance improvements. One such improvement is the implementation of pipelined architectures, in which multiple microprocessor instructions are processed simultaneously along various stages of execution, so that the processing of subsequent instructions (in program order) begins prior to the completion of earlier instructions. Because of pipelining, the effective rate at which instructions are executed by a microprocessor can approach one instruction per machine cycle in a single pipeline microprocessor, even though the processing of each individual instruction may require multiple machine cycles from fetch through execution. So-called superscalar architectures effectively have multiple pipelines operating in parallel, providing even higher theoretical performance levels.

Of course, as is well known in the art, branching instructions are commonplace in most conventional computer and microprocessor programs. Branching instructions are instructions that alter the program flow, such that the next instruction to be executed after the branching instruction is not necessarily the next instruction in program order. Branching instructions may be unconditional, such as JUMP instructions, subroutine calls, and subroutine returns. Some branching instructions are conditional, as the branch depends upon the results of a previous logical or arithmetic instruction.

Conditional branching instructions present complexity in microprocessors of pipelined architecture, because the condition upon which the branch depends is not known until execution, which may be several cycles after fetch. In these situations, the microprocessor must either cease fetching instructions after the branch until the condition is resolved, introducing a "bubble" of empty stages (i.e., potential instruction processing slots) into the pipeline, or must instead speculatively fetch an instruction (in effect guessing the condition) in order to keep the pipeline full, at a risk of having to "flush" the pipeline of its current instructions if the speculation is determined to be incorrect.

The benefit of speculative execution of instructions in keeping the pipeline full, particularly in architectures with long or multiple pipelines, typically outweighs the performance degradation of pipeline flushes, so long as the success rate of the speculative execution is reasonable. Many modern microprocessors therefore follow some type of branch prediction techniques by way of which the behavior of branching instructions may be predicted with some accuracy. One type of branch prediction is referred to as "static" prediction, as the prediction does not change over time or history. A simple static prediction approach merely predicts all branches to be "taken". An improved static branch prediction approach predicts according to branch direction, for example by predicting all branches in the forward direction to be "not taken" and predicting all backward branches (e.g., LOOP instructions in DO loops) to be "taken". Of course, unconditional branches may always be statically predicted as "taken".

Dynamic branch prediction refers to a known technique of branch prediction that uses the results of past branches to predict the result of the next branch. A simple well-known dynamic prediction technique merely uses the results of the most recent one or two conditional branching instructions to predict the direction of a current branching instruction.

A more accurate dynamic branch prediction approach predicts the direction of a branching instruction by its own branching history, as opposed to the branch results of other instructions. This approach is generally incorporated into modern microprocessors by way of a branch target buffer. A conventional branch target buffer, or BTB, is a cache-like table of entries that each store an identifier (a "tag") for recently encountered branching instructions, a branch history-related code upon which prediction is made, and a target address of the next instruction to be fetched if the branch is predicted as taken (the next sequential address being the address to be fetched for a "not taken" prediction). When a branching instruction is fetched, its address is matched against the tags in the BTB to determine if this instruction has been previously encountered; if so, the next instruction is fetched according to the prediction code indicated in the BTB for that instruction. Newly-encountered branching instructions are statically predicted, as no history is present in the BTB. Upon execution and completion of the instruction, the BTB entry is created or modified to reflect the actual result of the branching instruction, for use in the next occurrence of the instruction.

Various conventional alternative actual prediction algorithms that predict branches based upon the most recently executed branches or upon the branching history of the same instruction, are known in the art. A well-known simple prediction algorithm follows a four-state state machine model, and uses the two most recent branch events to predict whether the next occurrence will be taken or not taken. The four states are referred to as "strongly taken", "weakly taken", "weakly not taken", and "strongly not taken". A "strongly" state corresponds to the last two branches (either generally or for the particular instruction, depending upon the implementation) having been taken or not taken, as the case may be. A "weakly" state corresponds to the last two branches having differing results, with the next branch result either changing the prediction to the other result, or maintaining the prediction but in a "strongly" state.

A recent advance in branch prediction algorithms uses not only branch history results, but also branch pattern information, in generating a prediction of branch behavior. For example, a certain branch instruction may be a loop of three passes, such that its branch history will repetitively follow a pattern of taken-taken-not taken. Use of a simple two-bit, or four-state, prediction mechanism will not correctly predict the branching of this instruction, even though its behavior is entirely predictable. The well-known two-level adaptive branch prediction mechanism, described in Yeh & Patt, "Two-Level Adaptive Branch Prediction", *The 24th ACM/IEEE International Symposium and Workshop on Microarchitecture,* (November 1991), pp. 51–61, uses both branch history and branch pattern information to predict the results of a branching instruction. Branch prediction using the Yeh & Patt approach has been applied to microprocessor architectures using BTBs, as described in U.K. Patent Application 2 285 526, published Jul. 12, 1995.

A known limitation of branch prediction in deeply pipelined architectures arises from tight loops of program code, for example where the same branching instruction is encountered more than once within a range corresponding to the number of instructions in the pipeline. In this case, the actual branch history (and branch pattern information) that is modified upon execution and completion of the instruction is somewhat out of date, and may result in incorrect prediction of an otherwise predictable branch, because the updating of the results may not be "synchronized" with the most recent prediction of the branch result. This problem is described in International Publication No. WO 94/27210, published Nov. 24, 1994. As described in this publication, a known approach to avoid the problem of small program loops is to include "speculative branch history" information in the BTB entry for each branching instruction; the speculative branch history may be used to predict a branch if branches have been predicted for that instruction but have not yet been resolved. As described in WO 94/27210, separate fields may be provided in each BTB entry for the actual and speculative branch history information, with the actual branch history copied into the speculative branch history field upon the first speculative prediction. The use of speculative branch history in this manner permits the accurate prediction of branching patterns, even if occurring within small program loops.

According to this approach, however, a redundant copy of the actual branch history is kept in each BTB entry. For purposes of efficiency and chip area, it would be desirable to have only a single copy of the actual branch history in each BTB entry, rather than requiring additional storage area for the redundant copy. However, according to conventional techniques, a microprocessor having a single combined actual and speculative branch history field cannot recover from a misprediction if more than one speculative branch prediction is stored in this combined field. Especially as pipelines become deeper in modern microprocessors, many programs will have multiple instances of conditional branches within the pipeline at a given time, requiring the storage and use of multiple speculative branch predictions in predicting the next instance of the instruction.

SUMMARY OF THE INVENTION

The present invention may be implemented into a pipelined microprocessor incorporating speculative branch prediction. Each entry in the branch target buffer (BTB) includes additional bits for storing actual and speculative branch predictions, beyond those used to index the pattern history table or other memory containing the prediction for the branch. A counter is also provided which counts the number of speculative history bits in the branch history field of the BTB. In the event of a misprediction, only the unresolved speculative history bits are removed from the branch history field, as indicated by the value stored in the counter. The extent of actual history bits used in predicting branch instructions after a misprediction is therefore enhanced.

It is therefore an object of the present invention to provide a microprocessor with improved branch prediction performance using a combined actual and speculative branch history field.

It is a further object of the present invention to provide such a microprocessor in which the post-misprediction branch prediction performance is optimized.

It is a further object of the present invention to provide such a microprocessor in which the size of the branch target buffer is minimized while providing the improved prediction performance.

Other objects and advantages of the present invention will be apparent to those of ordinary skill in the art having reference to the following specification together with its drawings.

DETAILED DESCRIPTION OF THE PREFERRED EMBODIMENT

Figure 1:
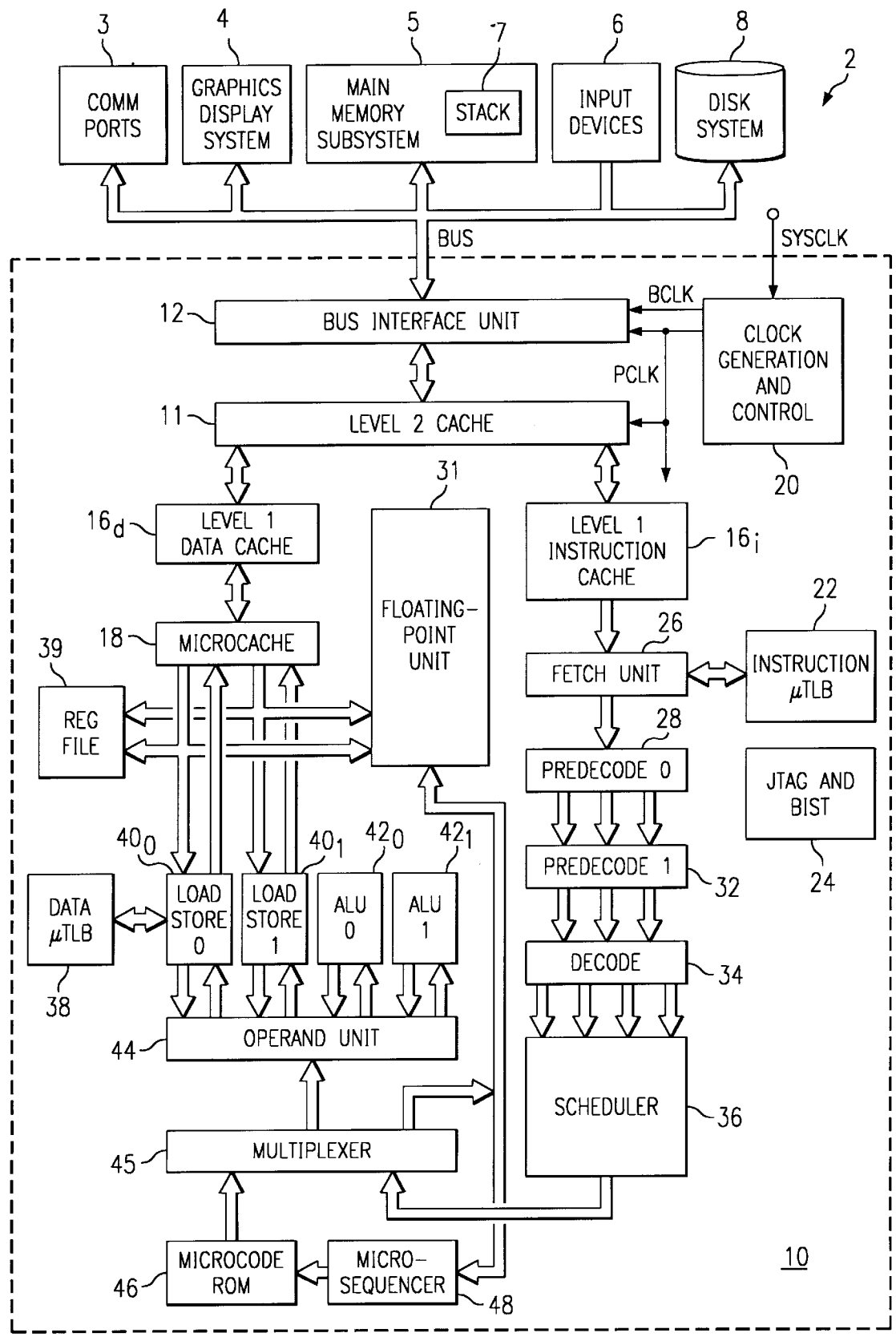
FIG. 1 is an electrical diagram, in block form, of a microprocessor and system according to the preferred embodiment of the invention.

Referring now to FIG. 1, an exemplary data processing system 2, including an exemplary superscalar pipelined microprocessor 10 within which the preferred embodiment of the invention is implemented, will be described. It is to be understood that the architecture of system 2 and of microprocessor 10 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 10, as shown in FIG. 1, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 2 contains such conventional subsystems as communication ports 3 (including modem ports and modems, network interfaces, and the like), graphics display system 4 (including video memory, video processors, a graphics monitor), main memory system 5 which is typically implemented by way of dynamic random access memory (DRAM), input devices 6 (including keyboard, a pointing device, and the interface circuitry therefor), and disk system 8 (which may include hard disk drives, floppy disk drives, and CD-ROM drives).

It is therefore contemplated that system 2 of FIG. 1 corresponds to a conventional desktop computer or workstation, as are now common in the art. Of course, other system implementations of microprocessor 10 can also benefit from the present invention, as will be recognized by those of ordinary skill in the art.

Microprocessor 10 includes bus interface unit (BIU) 12 connected to external bus BUS, which controls and effects communication between microprocessor 10 and the external elements in system 2. BIU 12 includes the appropriate control and clock circuitry to perform this function, including write buffers for increasing the speed of operation, and timing circuitry so as to synchronize the results of internal microprocessor operation with bus BUS timing constraints. Microprocessor 10 also includes clock generation and control circuitry 20 which, generates clock phases based upon system clock SYSCLK; in this example, clock generation and control circuitry 20 generates bus clock BCLK which is the controlling clock signal for bus operations upon external bus BUS, and core clock PCLK which is the controlling clock signal for internal operation of microprocessor 10.

As is evident in FIG. 1, microprocessor 10 has three levels of internal cache memory, with the highest of these as level 2 cache 11, which is connected to BIU 12 by way of an internal bus. In this example, level 2 cache 11 is a unified cache, and is configured to receive all cacheable data and cacheable instructions from bus BUS via BIU 12, such that much of the bus traffic presented by microprocessor 10 is accomplished via level 2 cache 11. Of course, microprocessor 10 may also effect bus traffic around cache 11, by treating certain bus reads and writes as "not cacheable". Level 2 cache 11, as shown in FIG. 1, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 10 is of the superscalar type, and thus includes multiple execution units. These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units (including FPU 31)

OP Operand: This stage retrieves the register operands indicated by the AOps

EX Execute: This stage runs the execution units according to the AOps and the retrieved operands WB Write-back: This stage stores the results of the execution in registers or in memory Referring back to FIG. 1, the pipeline stages noted above are performed by various functional blocks within microprocessor 10. Fetch unit 26 generates instruction addresses from the instruction pointer by way of instruction micro-translation lookaside buffer ($\mu$TLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 10 also includes circuitry 24 for controlling the operation of JTAG scan testing, and of certain built-in self-test (BIST) functions, ensuring the validity of the operation of microprocessor 10 upon completion of manufacturing, and upon resets and other events.

Figure 2:
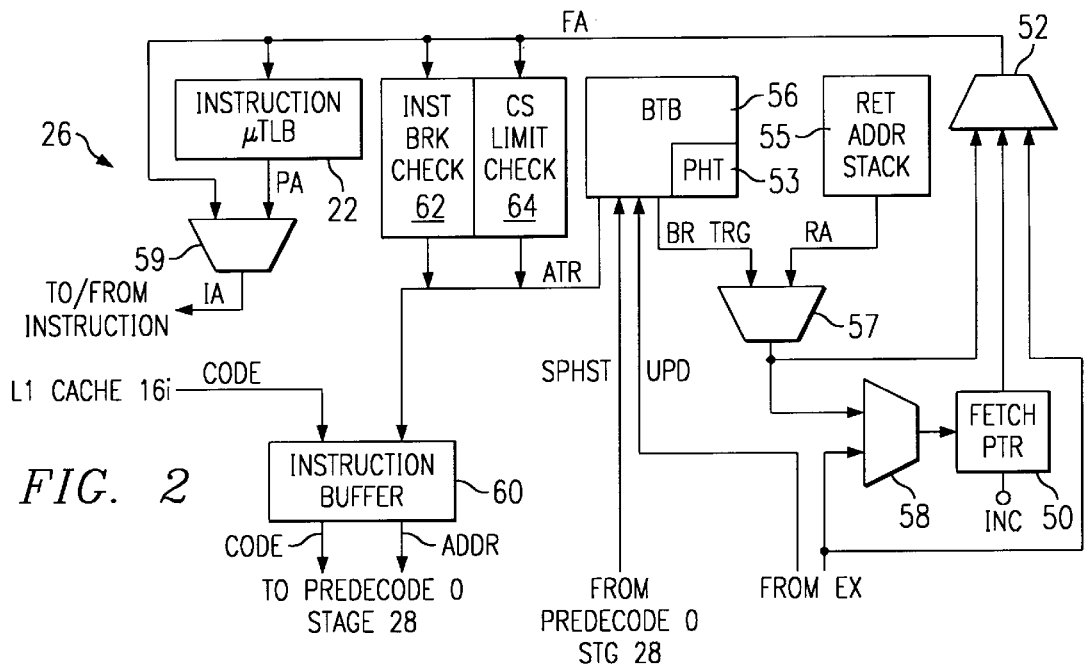
FIG. 2 is an electrical diagram, in block form, of the fetch unit of the microprocessor of FIG. 1.

Referring now to FIG. 2, the construction and operation of fetch unit 26 according to the preferred embodiment of the invention will now be described. As noted above, fetch unit 26 performs the function of determining the address of the next instruction to be fetched for decode. As such, fetch unit 26 determines the sequence in which instructions are loaded into the pipelines of microprocessor 10, and in this embodiment of the invention thus controls the speculative execution of addresses, particularly by way of branch prediction.

The operation of fetch unit 26 is based upon a logical fetch address FA that is generated according to one of several ways. Fetch address FA may be generated merely by the incrementing of fetch pointer 50 in fetch unit 26, in the case where the next sequential address is to be fetched for decoding. As shown in FIG. 2, fetch pointer 50 is a register in fetch unit 26, having an increment control input INC, and which presents its output to one input of multiplexer 52. A second way in which the fetch address FA is generated is by one of the execution units (e.g., microsequencer 48) to multiplexer 52, for example in the event of a branch that is not predicted by fetch unit 26.

Fetch unit 26 also includes circuitry for generating the next fetch address FA in ways that are not in program sequence. As shown in FIG. 2, fetch unit 26 includes return address stack 55, which is a last-in-first-out (LIFO) memory having several locations, at which return addresses for subroutine calls and subroutine returns are stored for use in speculative execution of subroutines. In this embodiment of the invention, fetch unit 26 also includes branch target buffer (BTB) 56, which is a cache-like arrangement of entries that store data indicating the prior history of branches from which the current instance of a branching instruction may be predicted, along with target addresses of branching instructions for use as the fetch address FA, so that the pipeline may be maintained in a filled condition as often as possible. In this embodiment of the invention, BTB 56 is of the two-level type, and as such includes pattern history table 53 for storing prediction codes that are called by branch history information. Target instruction addresses are presented to multiplexer 57 by return address stack 55 and BTB 56 on buses RA, BR TRG, respectively. The output of multiplexer 57 is connected to the third input of multiplexer 52, and to multiplexer 58 so that fetch counter 50 may be updated. The three inputs to multiplexer 52 thus present three sources for the next fetch address FA, which is a logical address as opposed to a physical address.

Fetch address FA is presented, in fetch unit 26, to various functions therein in order to control the fetching of the next instruction for decoding. For example, fetch unit 26 is in communication with instruction μTLB 22, which returns a physical address PA matching the logical fetch address FA if it points to a location that has previously been translated; alternatively, the logical fetch address FA will be translated into a physical address by a main translation unit (not shown) that is external to fetch unit 26. In any event, an instruction address IA is presented by fetch unit 26 to level 1 instruction cache $16_i$ to retrieve instruction codes therefrom; of course, if a cache miss at level 1 instruction cache $16_i$ occurs, the physical address is presented to unified level 2 cache 14 and, in the event of a cache miss at that level, to main memory. In response to instruction address IA, level 1 instruction cache $16_i$ presents an instruction code sequence CODE to instruction buffer 60 in fetch unit 26, for eventual presentation to predecode 0 stage 28. In the case where each instruction address IA addresses a block of sixteen instructions, instruction buffer 60 has a capacity of sixteen instructions.

Fetch unit 26 also includes other conventional functions, such as instruction break check circuit 62 which halts additional fetching for instructions identified as breaks. Fetch unit 26 also includes a code segment limit check circuit 64, for determining whether logical fetch address FA points to an address outside the limit of the bounds of the current code segment.

Figure 3:
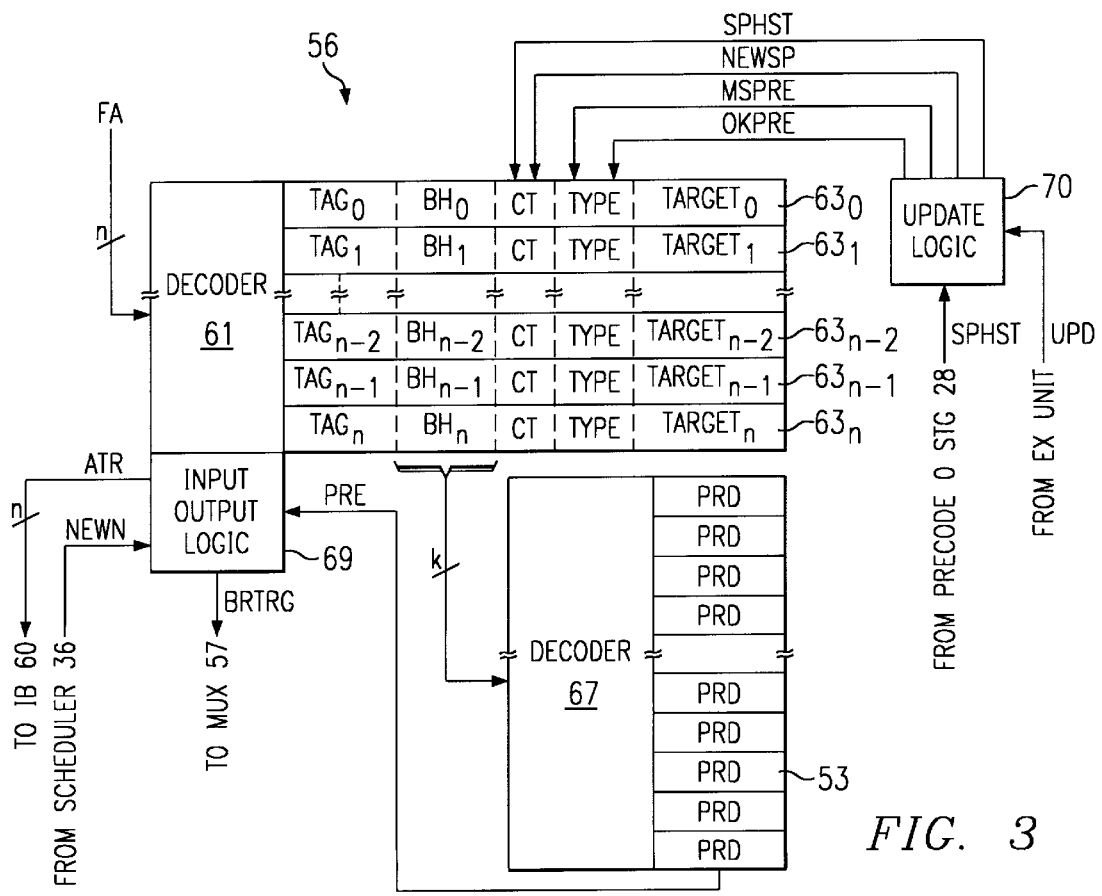
FIG. 3 is a schematic illustration of the branch target buffer and pattern history table of the microprocessor of FIG. 1 according to a first preferred embodiment of the invention.

Logical fetch address FA is connected to an input of BTB 56, which determines whether fetch address FA points to a branch instruction that has recently been fetched, and which may have branch history stored in BTB 56 for use in speculative execution. As noted hereinabove, speculative execution is an especially important performance enhancement in deeply pipelined microprocessors such as superscalar microprocessor 10 of FIG. 1, as mispredicted branches (or pipeline stalls awaiting the results of a conditional branch) result in severe penalties, measured in lost execution opportunities. BTB 56 is a memory arranged in a cache-like configuration, for example as a 512 entry, four-way set-associative cache buffer; of course, BTB 56 may alternatively be arranged as a direct-mapped or fully-associative cache, depending upon the particular indexing arrangement desired in order to return a predicted branch behavior and a target instruction address (if the branch is predicted as taken). Referring now to FIG. 3, the construction of BTB 56 will now be described.

As noted above, BTB 56 in this example is a four-way set-associative cache memory having multiple entries 63; only one way is illustrated in FIG. 3, for the sake of clarity. Each entry 63 in BTB 56 has a tag field TAG used to identify it with the logical fetch address FA of a specific branching instruction, against which decoder 61 matches a portion of the incoming logical fetch address FA. Tag field TAG may directly store selected bits of the logical fetch address FA of its corresponding branching instruction, or may instead correspond to a logical combination of these selected logical address bits, as is known in the art. Typically, tag field TAG will include a line address and an offset indicating the byte offset of the instruction in the fetch line. Each entry 63 in BTB 56 also has target field TARGET which contains the logical address of the branch instruction target address. The target address in portion TARGET of an entry 63 that matches a branch instruction predicted as taken will be presented by input/output logic 69 to multiplexer 57 on bus BR TRG, as noted above. If the branch is not taken, merely the next sequential logical address (i.e., the contents of fetch pointer 50) will be selected by multiplexer 52 as the next logical fetch address FA.

According to this embodiment of the invention, each entry 63 also includes an m-bit branch history field BH which stores both actual branch history and speculative branch history, and a counter value CT that indicates the number of speculative branch history bits in branch history field BH; the operation of these history and counter bits will be described hereinbelow. Each entry 63 of BTB 56 also includes indicator TYPE, which describes the branch instruction type for its associated instruction (i.e., conditional branch, CALL, JUMP, or RETURN) for use in predicting the branch; unconditional branches, such as CALL, JUMP, and RETURN are predicted as always taken. Additional bits such as LRU bits, valid bit, and other control bits (not shown), are also provided in each entry 63 of BTB 56.

According to this embodiment of the invention, BTB 56 includes pattern history table (PHT) 53, which is used to predict the behavior of conditional branches based upon the most recent k bits of branch history field BH for the selected BTB entry. While FIG. 2 illustrates that PHT 53 is part of BTB 56, it will of course be understood that PHT 53 may be physically implemented as separate circuitry. BTB 56 according to this embodiment of the invention is therefore of the two-level type, as two different indices (logical address and branch history) are used in selecting the prediction. According to this embodiment of the invention, the number of bits (k) used to index PHT 53 and derive the branch prediction is less than the number of bits (m) in branch history field BH. PHT 53 is a simple lookup memory with selector 67 receiving the k branch history bits from the selected entry 63 and selecting one of $2^k$ prediction entries PRD corresponding thereto. Selector 67 may be implemented as a decoder, or as a simple multiplexer, for performing this function. The selected prediction is presented on lines PRE to output logic 69, for presentation on bus ATR to instruction buffer 60.

As noted above, BTB 56 includes input/output logic 69 which serves to present a valid branch target address to multiplexer 57 in the event of a predicted-taken branch; input/output logic 69 also will indicate on lines ATR to instruction buffer 60 the corresponding branch prediction for the current instruction. In addition, input/output logic 69 receives appropriate tag, target, offset, type, and history information for newly-encountered branching instructions on lines NEWN from scheduler 36, and writes this information into a selected entry 63 in the conventional manner. Control bits, such as LRU and the like, are used in selection of the entry 63 into which information for the new instruction is to be written, as known in the art.

BTB 56 also includes update logic 70 which receives signals on bus UPD from the execution units (e.g., ALUs 42) that indicate the results of previously predicted branching instructions. Update logic 70 also receives signals from the decode stages of the pipeline (e.g., predecode 0 stage 28) on lines SPHST indicating the prediction made for a branching instruction. Update logic 70 includes logic circuitry for generating a signal on line NEWSP to branch history field BH in a selected entry 63, to update the branch history according to speculative prediction forwarded thereto on line SPHST. Update logic 70 also generates a signal on line OKPRE to count field CT indicating a successful branch prediction. Update logic 70 also generates a signal on line MSPRE indicating, to a selected entry 63, that its branch was mispredicted. The updating of branch history fields BH in entries 63 of BTB 56 for speculative prediction history, and also with actual branch history upon completion of branching instructions will now be described relative to FIG. 4.

Figure 4:
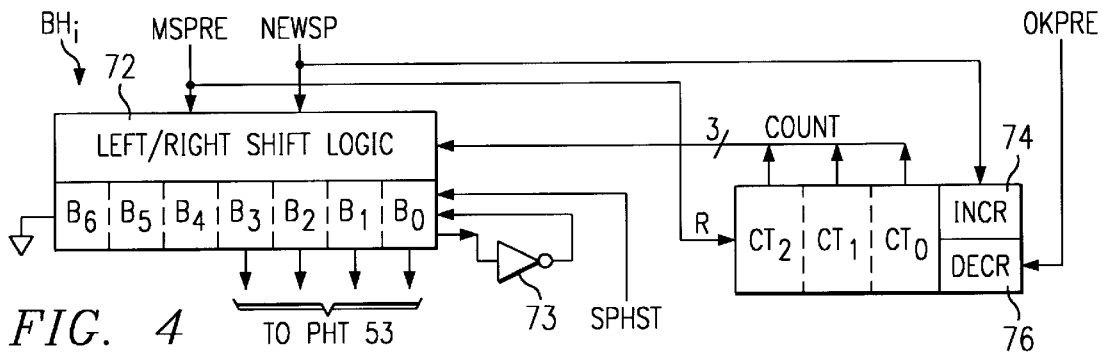
FIG. 4 is an electrical diagram, in block form, of update circuitry for the branch history field of the branch target buffer of the microprocessor of FIG. 1 according to the preferred embodiments of the invention.

FIG. 4 illustrates the detailed construction of an example of branch history field $BH_i$ and count field $CT_i$ of an entry $63_i$ of BTB 56; of course, branch history fields BH and count fields CT of the other entries 63 in BTB 56 will be similarly constructed. In this example, branch history field $BH_i$ is implemented as a shift register capable of shifting in either direction, and includes seven bit positions $B_6$ through $B_0$ (i.e., m=7), with bit position $B_0$ containing the branch history of the most recent instance of the branch instruction corresponding to entry $63_i$, and with bit position $B_6$ containing the branch history of the seventh most recent instance. As will be apparent from the following description, the branch histories indicated by bit positions $B_6$ through $B_0$ may be either actual or speculative branch histories. Associated with bit positions $B_6$ through $B_0$ is left/right shift logic 72, which controls the shifting of the contents of bit positions $B_6$ through $B_0$ according to signals received from update logic 70 on lines NEWSP (indicating receipt of a new speculative branch history on line SPHST) and MSPRE (indicating that a previous instance of the corresponding branch instruction was mispredicted).

Left/right shift logic 72 also receives a count value COUNT from count field $CT_i$. Count field $CT_i$ is a counter that counts the number of bit positions $B_6$ through $B_0$ that contain speculative, rather than actual, branch history values. Incrementing circuitry 74 increments the contents of count field $CT_i$ upon receipt of a new speculative prediction on line SPHST, as indicated by a signal on line NEWSP from update logic 70. Conversely, decrementing circuitry 76 decrements the contents of count field $CT_i$ responsive to line OKPRE from update logic upon the completion of an instance of its corresponding branch instruction in which the prediction was correct, as the oldest speculative branch history bit in bit positions $B_6$ through $B_0$ may now be considered as actual, rather than speculative, branch history. Line MSPRE is connected to a reset input R of count field $CT_i$, so that the count may be zeroed in the event of a mispredicted branch. Count field $CT_i$, in this example, has three bit positions $CT_2$ through $CT_0$, corresponding to the number of bit positions $B_6$ through $B_0$ (m=7), and will indicate the amount of shifting required in the event of a misprediction.

Of course, count field $CT_i$ may alternatively count the number of bit positions $B_6$ through $B_0$ that correspond to actual branch history bits; in this case, count field $CT_i$ would be decremented with each new speculative prediction, incremented responsive to a successful prediction, and reset upon processing a misprediction. Further in the alternative, count field $CT_i$ could instead be implemented as a pointer that points to the most recent one of bit positions $B_6$ through $B_0$. Updating would then cause the pointer value to advance to the next one of bit positions $B_6$ through $B_0$, which would in fact be the oldest one of bit positions $B_6$ through $B_0$ at that time. In this case, branch history field $BH_i$ would operate as a circular buffer.

Further in the alternative, branch history field $BH_i$ may be implemented as a conventional register that is in bi-directional communication with a parallel load left/right shift register. In this case, updating of the contents of branch history field $BH_i$ would be accomplished by loading the shift register with the contents of branch history field $BH_i$, shifting the shift register in either direction as indicated by the operation, and by then storing the shifted contents into branch history field $BH_i$.

Referring back to the example of FIG. 4, the four most recent bit positions $B_3$ through $B_0$ are presented as the index to PHT 53; in other words, k=4 in this example. A shift-out output of most recent bit position $B_0$ is presented to the input of inverter 73, the output of which is connected to the input of most recent bit position $B_0$. In the event of misprediction, inverter 73 will operate to receive the oldest speculative prediction as it is shifted out from bit position $B_0$, and to rewrite the opposite state thereinto as the most recent actual history, as will be described in further detail hereinbelow. Line SPHST, which communicates a new speculative branch history indicator, is also presented to most recent bit position $B_0$. The left input to oldest bit position $B_6$ is connected to ground, to null the entries of the oldest bit positions $B_6$ through $B_0$ in the event of a misprediction, as will also be described in detail hereinbelow.

Figure 5:
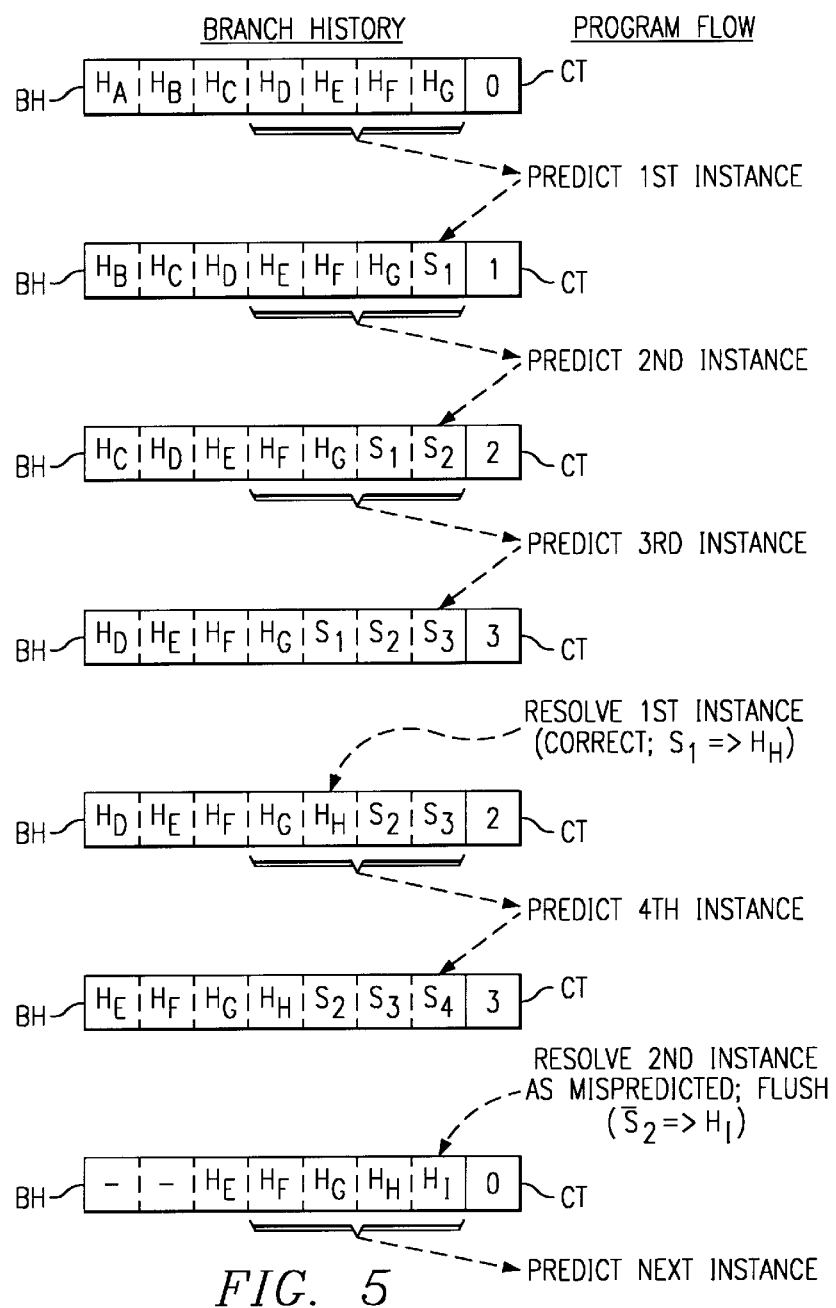
FIG. 5 is an illustration of the contents of the branch history field in the branch target buffer according to the preferred embodiments of the invention, as modified in combination with a sample program flow.

In operation, referring to FIGS. 3, 4, and 5 in combination, two-level BTB 56 functions to provide fetch unit 26 with a branch target address as the next instruction to be fetched, when a branch is predicted as taken. Upon presentation of a logical fetch address FA in each instruction fetch cycle, a portion of this fetch address FA is received by decoder 61 in BTB 56. For branching instructions that have not been recently encountered (and thus do not have an entry 63 in BTB 56 assigned thereto at this time), decoder 61 will not find a matching tag in any of the TAG fields of entries 63, and will return a "not-taken" prediction on lines ATR to instruction buffer 60. In this case, a valid branch target address will not be presented on bus BR TRG to multiplexer 57, and multiplexer 52 will select another source (typically fetch pointer 50) for the next logical fetch address FA. Upon completion of the execution stage for this branching instruction, BTB 56 will be updated in the conventional manner by input/output logic 69 based upon information provided thereto on lines NEWN, to provide an entry 63 for this instruction.

For unconditional branching instructions that have previously been encountered and that have a corresponding entry 63 in BTB 56 (i.e., for which the portion of fetch address FA matches the TAG field of an entry 63), as indicated by the TYPE portion of its corresponding entry 63, BTB 56 will present a "taken" prediction to instruction buffer 60 on lines ATR, and will present the target address from the TARGET field of this entry 63 on bus BR TRG to multiplexer 57, for use by multiplexer 52 as the source of the next instruction address (in the case of subroutine RETURN instructions, multiplexer 57 will select the appropriate return address from return address stack 55).

For conditional branching instructions, BTB 56 generates a prediction from pattern history table 53 by applying, to PHT 53, the k bits in branch history field BH that correspond to the k most recent actual or speculative predictions for that branching instruction. In the example of FIG. 4, where k=4, the contents of bit positions $B_3$ through $B_0$ of branch history field BH are forwarded to PHT 53. Selector 67 decodes these k bits to select the appropriate prediction code PRD, which is forwarded on lines PRE to input/output logic 69. The prediction is then forwarded to instruction buffer 60 on lines ATR. If the prediction is "taken", TARGET field of the corresponding entry 63 is presented on bus BR TRG, for selection by multiplexers 57 and 52 as the next logical fetch address FA; if the prediction is "not taken", a valid target address is not presented on bus BR TRG, and multiplexer 52 is controlled to select the incremented output of fetch pointer 50 as the address for the next instruction to be fetched.

The branch prediction of the currently-decoded conditional branching instruction is communicated to update logic 70 by predecode 0 stage 28 on line SPHST. Update logic 70 will then update branch history field BH for this corresponding instruction by issuing a signal on line NEWSP to left/right shift logic 72, so that bit position $B_0$ accepts the prediction on line SPHST as its new state, with the contents of branch history field BH shifting one bit position to the left. The signal on line NEWSP is also applied to increment logic 74 to increment the value stored in count field CT for this instruction by one, thus indicating that an additional speculative branch prediction is now contained within its branch history field BH.

Upon completion of the branching instruction, the appropriate execution unit will forward the actual result of the branch to update logic 70 on lines UPD. Update logic 70 then generates the appropriate signals to branch history field BH in the entry 63 of BTB 56 corresponding to the completed instruction to either verify the corresponding prediction as valid, or to reset the branch history if the prediction was incorrect. According to this embodiment of the invention, a correct prediction is communicated by update logic 70 issuing a signal on line OKPRE, which is applied to decrement logic 76. Decrement logic 76 causes the count field CT of the corresponding entry 63 for the completed branching instruction to decrement by one, indicating that one less speculative prediction is now contained within its corresponding branch history field BH (i.e., the oldest speculative prediction is now actual branch history).

If the branching instruction just completed was mispredicted, however, update logic 70 must clear all speculative branch history bits from branch history field BH of the corresponding entry 63, and insert the correct result thereinto. This is accomplished by update logic 70 issuing a signal on line MSPRE. Left/right shift logic 72 responds to this signal by shifting, to the right, the contents of branch history field BH for the appropriate entry $63_i$ by the contents of count field CT communicated on lines COUNT. This right-shifting effectively eliminates all of the speculative branch history from branch history field BH, with the mispredicted speculative branch history shifted out from bit position $B_0$. Bit position $B_0$ of branch history field BH is then rewritten with the actual branch history for the mispredicted speculative prediction, by inverter 73 inverting the shifted-out misprediction and presenting the inverted state (which is now the most recent actual branch result) to the input of bit position $B_0$. Alternatively, the execution unit could communicate the actual result of the branch on line SPHST. In either case, the contents of branch history field BH are shifted one position to the left, under the control of left/right shift logic 72, to accommodate the logical complement of the mispredicted branch as the most recent actual branch history. Further in the alternative, the contents of branch history field BH may be shifted right by the count value minus one, and then the misprediction in bit position $B_0$ may be inverted and rewritten into bit position $B_0$ as the correct state. Line MSPRE also resets count field CT for this entry 63, indicating that no speculative branch history is now contained therein.

Because branch history field BH contains m bit positions, which is more than the k bit positions that index into PHT 53 to derive the prediction value, older actual branch history information becomes available again for use in predicting the next instance of the mispredicted branching instruction. This improves the prediction rate for branches after misprediction over conventional BTB implementations, particularly those having fixed branch history field sizes. Referring now to FIG. 5 in combination with FIG. 4, these advantages obtained according to the preferred embodiment of the invention will now be described in further detail, by way of reference to an exemplary code fragment.

FIG. 5 illustrates the state of branch history field BH and count field CT in an entry 63 of BTB 56, as it is modified by update logic 70 according to the preferred embodiment of the invention for the sample program flow shown as an example in FIG. 5. In this example, the initial condition of branch history field BH stores actual branch history states $H_A$ through $H_G$ corresponding to the result of the seven most recent instances of a specific conditional branch instruction associated with this entry 63. The rightmost bit position stores the most recent branch history; in other words, branch history bit $H_G$ is the actual result of the most recent instance of this branching instruction. At this point, since all seven bit positions $B_6$ through $B_0$ contain actual branch history, none contain speculative branch history and thus the value of count field CT is zero.

In this example, a first instance of this same conditional branching instruction is reached in the program; as described hereinabove, this event is detected by decoder 61 of BTB 56 matching a portion of the logical fetch address FA with TAG field of the one of entries 63 corresponding to the fields illustrated in FIG. 5. In response to this event, BTB 56 generates a predicted branch result by interrogating the k most recent bits of branch history field BH. In this example, the four most recent actual branch history bits $H_D$ through $H_G$ are applied to PHT 53, which returns prediction code PRD to input/output circuitry 69. This prediction is communicated on lines PRE by input/output circuitry 69 to instruction buffer 60, for use in the execution of this branching instruction.

In addition, since microprocessor 10 according to this example of the invention uses speculative branch history in predicting branches, the prediction made for this first instance is written into most recent bit position $B_0$ of branch history field BH. Referring back to FIG. 4, this is accomplished by signal NEWSP being asserted. This shifts the contents of branch history field BH one bit position to the left, and writes the most recent speculative prediction $S_1$ on line SPHST into bit position $B_0$. The signal on line NEWSP also causes count field CT for this entry to increment by one, as shown in FIG. 5, indicating that the contents of branch history field BH for this entry 63 contains one speculative branch history bit, in its rightmost (most recent) bit position $B_0$.

In the example of FIG. 5, a second instance of this same branching instruction is next received in sequence, prior to the first instance being executed and becoming resolved. This results in a new speculative branch prediction being made, based upon the k (four) most recent branch history bits being applied to PHT 53 which include, at this point, speculative branch prediction $S_1$ from the prior instance of this instruction. This branch prediction, $S_2$, is then written into most recent rightmost bit position $B_0$ of branch history field BH, with the remaining contents of branch history field BH being shifted left by one bit position. Count field CT is also incremented to indicate that branch history field BH for this entry 63 now contains two speculative predictions. In this example, a third instance of this branching instruction is next received (again, prior to resolution of the first instance of this instruction which is still in the pipeline). This third instance is again predicted, using the k (four) most recent branch history results, actual and speculative. Branch history field BH is again updated to receive the speculative branch history corresponding to the prediction $S_3$ of this third instance, with the contents shifted left by one bit position, and count field CT advanced to indicate that three speculative branch predictions are included in branch history field BH for this instruction. The three rightmost, or most recent, bit positions $B_2$ through $B_0$ contain the three prediction values $S_1$ through $S_3$, respectively, while the higher four (i.e., oldest) bit positions $B_6$ through $B_3$ store actual branch history bits $H_D$ through $H_G$.

In this exemplary program flow, after prediction of the third instance of this branching instruction, execution of the first instance of this branching instruction is completed, such that microprocessor 10 now knows whether its prediction was correct. In this example, the prediction of the branch for the first instance of this instruction was correct. This means that the branch prediction corresponded to the actual execution of this instruction, and that therefore speculative branch prediction $S_1$ in branch history field BH is equal to the actual branch history of this instruction. Referring back to FIG. 4, this is communicated to this entry 63 by line OKPRE carrying a signal from update logic 70 in response to a completion signal communicated thereto by the execution unit involved in this instruction. The signal on line OKPRE causes count field CT for this instruction to decrement (indicating that one fewer speculative branch history bits are contained in branch history field BH). By decrementing count field CT, the oldest speculative branch history bit $S_1$ is thereby converted into the newest actual history bit $H_H$, as shown in FIG. 5 at this point.

In this exemplary program flow, a fourth instance of this same branching instruction is next encountered, prior to completion and resolution of the second instance. Again, the k (four) rightmost bit positions of branch history field BH are used to predict the direction of this instance of the branching instruction, which now include actual branch history bits $H_G$, $H_H$, and speculative branch predictions $S_2$, $S_3$. These four bits are applied, as before, to PHT 53 to return a prediction code. Branch history field BH is then updated to include this prediction $S_4$ in its rightmost bit position $B_0$, and count field CT is incremented to indicate that three speculative branch predictions ($S_2$ through $S_4$) are now included therein.

The second instance of this branching instruction is next resolved; however, in this example, this instance was mispredicted. The misprediction is communicated by the execution unit to update logic 70 which, in turn, issues a signal on line MSPRE to left/right shift logic 72 and to count field CT. This misprediction means that the speculative branch history bit $S_2$ for this second instance of the branching instruction is incorrect, and that all subsequent speculative branch history is invalid (as having been made following an incorrect branch prediction). Branch history field BH for this instruction is, according to this preferred embodiment of the invention, shifted right by a number of bit positions equal to the contents of count field CT; in this example, branch history field shifts right by three bit positions. Following this shift, the incorrect branch prediction is then inverted, for example by operation of inverter 73 of FIG. 4, with the inverted state then rewritten into the rightmost (most recent) bit position $B_0$ of branch history field BH, with the remainder of the contents shifted left by one bit position to accommodate the actual branch history $H_I$ for this most recently resolved instance of the branching instruction; this actual branch history $H_I$ is the logical complement (opposite) of the speculative branch prediction $S_2$ made for this instance of the branching instruction. Count field CT is then zeroed to indicate that no speculative branch history is now contained in branch history field BH.

After this misprediction is resolved, a number of the leftmost bit positions of branch history field BH of the entry 63 in BTB 56 for this branching instruction are invalid, because the oldest branch history bits ($H_A$ through $H_D$) were shifted out by predictions of later instances of the same branching instruction. However, according to this embodiment of the invention, these null leftmost bit positions do not enter into the prediction of the next instance of this same branching instruction, as only the k (four) rightmost bits are used. Accordingly, in this example, the next instance of this branching instruction will be predicted by applying actual history bits $H_F$ through $H_I$ to PHT 53. All four of these actual history bits have been set according to observed branch behavior. As a result, the prediction rate for branching instructions being encountered the first one or more times after misprediction is improved according to the present invention, considering that actual branch history is available for the prediction.

Figure 6:
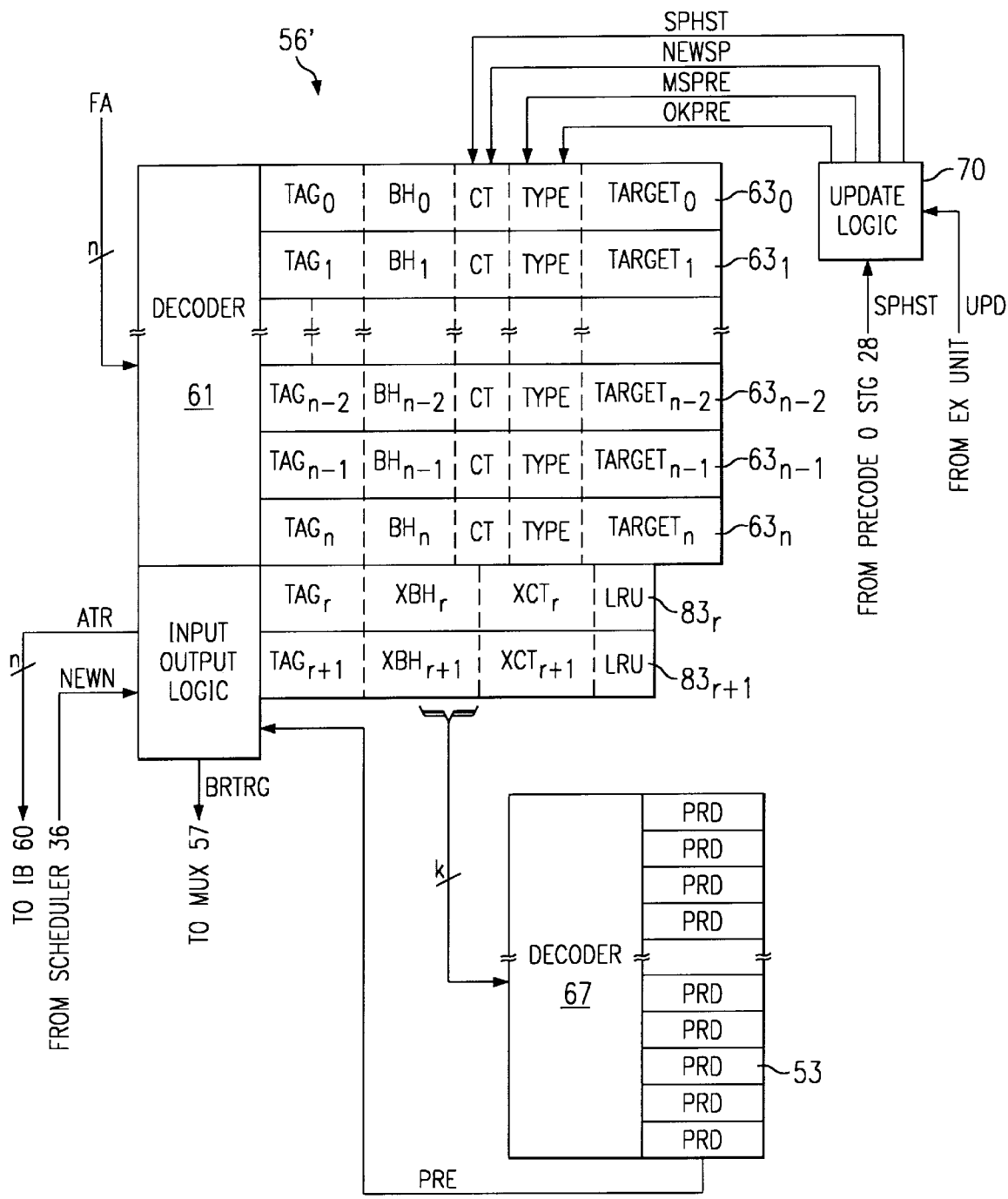
FIG. 6 is a schematic illustration of the branch target buffer and pattern history table of the microprocessor of FIG. 1 according to a second preferred embodiment of the invention.

Referring now to FIG. 6, BTB 56' according to a second embodiment of the invention will now be described. Like components of BTB 56' as those in BTB 56 of FIG. 3 will be referred to by the same reference numerals. As will become apparent from the following description, BTB 56' according to this second embodiment of the invention provides the capability of additional depth of speculative branch history, at a relatively modest cost. This additional branch history depth will be especially beneficial in microprocessors with very deep pipelines, where a conditional branching instruction may be encountered many times (e.g., up to on the order of sixteen times) within the same pipeline instruction window. This additional history depth reduces the likelihood that the number of speculative instances will exceed the maximum count value in count field CT of entries 63; if this were to occur, a misprediction would eliminate all actual branch history, making the successful prediction rate of the next k instances of the instruction quite low.

As shown in FIG. 6, BTB 56' is constructed very similarly to BTB 56 described hereinabove, with the addition of two extended entries $83_r$, $83_{r+1}$ provided in BTB 56'; the number of extended entries 83 provided in BTB 56' according to this embodiment of the invention may vary from one to several, depending upon the particular design implementation and optimization. In this example, extended entries 83 are copies of portions of those entries 63 that correspond to the most recent two conditional branch instructions. Branch history information is maintained for unconditional branches only in regular entries 63. In other words, in this example, the two entries 63 associated with the most recently fetched conditional branch instructions will have also have an extended entry 83 associated therewith.

Each of extended entries 83 include tag field TAG, which includes a line address portion and an offset portion, and which will be equal to the tag field of its corresponding entry 63. Each of extended entries 83 also includes an extended branch history field XBH, and an extended count field XCT. Extended branch history field XBH is larger than the corresponding branch history field BH in the associated entry 63. For example, extended branch history field XBH may have fifteen, or even thirty-one, bit positions for storing actual and speculative branch history. The size of extended count field XCT will correspond to the size of extended branch history field XBH (e.g., extended count field XCT will be five bits wide for up to a thirty-one bit extended branch history field XBH). A least-recently-used bit LRU is also provided in each of extended entries 83, to indicate the one of extended entries 83 that is the least recently updated. One should note that extended entries 83 do not include a target address field, as the target instruction address is stored in the corresponding entries 63 for the same instructions. In addition, extended entries 83 need not have an instruction type field, as only conditional branches are entered into extended entries 83.

In operation, if a conditional branch instruction is encountered, in the fetch stage, which has an entry 63 already associated therewith but with only actual branch history stored therein (i.e., its count field CT is zero), a copy of the TAG field and branch history field BH is written into the least-recently-used one of extended entries 83. The extended count value XCT is set to zero at this time, as no speculative history is contained therein. Upon each subsequent instance of this same conditional branch instruction (presuming that not more than one other branch instruction has not been fetched in the meanwhile), the branch prediction will be written into both the branch history field BH of entry 63 and the extended branch history field XBH of entry 83, with the count fields (CT, XCT, respectively) incremented accordingly.

Alternatively, the contents of branch history field BH of entry 63 may not be copied into an extended entry 83 until a threshold number of speculative predictions are contained within the branch history field BH. For example, the threshold may be set at four speculative predictions, which would leave three actual history bits set in branch history field BH and thus a full four (k=4) bits of actual branch history useful in making a prediction after a misprediction. Upon the next instance of the same branching instruction without a resolved prediction, the contents of entry 63 for this instruction could then be copied into an extended entry 83, preserving the ability to recover from a misprediction using actual branch history information stored in extended entry 83.

For each speculative prediction that is correct, the count fields CT, XCT will each be decremented, as described hereinabove. In the event of a misprediction, both of entries 63, 83, will shift out all speculative branch history from branch history field BH and extended branch history XBH, rewrite the most recent bit position of branch history field BH and extended branch history XBH with the actual result of the mispredicted branch, and reset the count fields CT, XCT to zero. However, for tightly looped code in deep pipeline microprocessors, the number of branch predictions may have exceeded the capacity of branch history field BH in the corresponding entry 63 (i.e.,. the count value in count field CT is at its maximum of seven, in the above example). In such an event, the shifting out of speculative branch prediction information will empty branch history field BH. The extended length of extended branch history field XBH of the corresponding extended entry 83 permits the additional storage of branch history information, however. If misprediction occurs after such a large number of predictions, therefore, the shifting of extended entry 83 will move actual branch history information into the most-recent bits of extended branch history field XBH that will not be present in entry 63.

According to this embodiment of the invention, therefore, following the shifting and rewriting of entries 63, 83 for the mispredicted instruction, the m most-recent bits of extended branch history field XBH of extended entry 83 for the mispredicted instruction are written into branch history field BH of entry 63 for the same instruction. The actual history information may then be used in the next encountered instance of the branch.

In this way, the number of speculative branch predictions for this instruction may exceed the capacity of branch history field BH of entry 63, while still maintaining accurate branch history information, in many cases, for use in predicting the next instance of the instruction after a misprediction. The extended size of the extended branch history field according to this embodiment of the invention therefore increases the likelihood that the actual branch history information will be retained, even in deeply pipelined microprocessors executing tightly looped program code. Also according to this embodiment of the invention, the additional capacity is limited to only the most recently encountered conditional instructions, thus limiting the size and chip are required for implementation of BTB 56'.

In each of the above embodiments of the invention, a branch target buffer is provided that has improved efficiency in design and implementation of the branch history fields. This improved efficiency arises from the inclusion and operation of the counter or pointer that identifies the number of speculative branch history bits included in the branch history, and that therefore controls the elimination of speculative branch history only to the extent that speculative branch history is present. In addition, actual branch history is utilized, in each prediction, to the extent available, regardless of the number of speculative predictions previously made. This allows actual and speculative branch history to share the same storage resource in the BTB, requiring fewer storage bits for this function.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A microprocessor, comprising:
an instruction execution pipeline, comprising an execution unit, and an instruction decode unit for decoding instructions for execution by the execution unit, the instruction execution pipeline having a plurality of stages for processing instructions in sequence;

an instruction memory for storing instruction codes according to instruction addresses; and a fetch unit, for addressing the instruction memory with an instruction address to retrieve instruction codes for application to the instruction pipeline, comprising:

a branch target memory comprised of a plurality of entries, each entry having a tag field corresponding to the instruction address of an associated branching instruction, having a branch history field for storing a sequence of actual branch history and speculative branch predictions for its associated branching instruction, and having a count field for storing a count value corresponding to the number of speculative branch predictions in the branch history field; and a prediction circuit, coupled to the branch target memory, for generating a branch prediction, the branch prediction being taken or not-taken, responsive to receiving a most-recent portion of the branch history field of a selected entry.

2. The microprocessor of claim 1, wherein the branch history field of each of the entries is represented by a first plurality of bits;

and wherein the most-recent portion of the branch history field comprises a second plurality of bits that is fewer than the first plurality of bits.

3. The microprocessor of claim 2, wherein the prediction circuit comprises a pattern history table, comprising:

a plurality of prediction entries; and a selector for receiving the most-recent portion of the branch history field of a selected entry from the branch target memory and for selecting one of the plurality of prediction entries responsive thereto.

4. The microprocessor of claim 1, wherein the fetch unit further comprises history update circuitry, coupled to the instruction pipeline and to the branch target memory, for modifying the branch history field of an entry in the branch target memory associated with an executed branching instruction.

5. The microprocessor of claim 4, wherein the history update circuitry is also for shifting the previous contents of the branch history field to receive a speculative branch prediction, as a most recent bit of the branch history field of the selected entry, corresponding to the branch prediction generated by the prediction circuit for the branching instruction associated with the selected entry.

6. The microprocessor of claim 5, wherein the history update circuitry is also for adjusting, in a first direction, the count value of the count field of the selected entry as it shifts the branch history field of the selected entry to receive the speculative branch prediction.

7. The microprocessor of claim 6, wherein the history update circuitry is also for adjusting, in a second direction, the count value in the count field of an entry in the branch target memory associated with an executed branching instruction, responsive to the execution pipeline indicating that the branch prediction was correct.

8. The microprocessor of claim 7, wherein the history update circuitry is also for eliminating speculative branch predictions from the branch history field of an entry in the branch target memory associated with an executed branching instruction, and for replacing actual branch history into the most-recent portion of the branch history field of that entry, responsive to the execution pipeline indicating that the branch prediction was incorrect.

9. The microprocessor of claim 8, wherein the history update circuitry is also for writing the most-recent bit of the branch history field of the entry in the branch target memory associated with an executed branching instruction, with an actual branch history bit corresponding to the execution of its associated branching instruction.

10. The microprocessor of claim 8, wherein the history update circuitry is also for resetting the count value in the count field of an entry in the branch target memory associated with an executed branching instruction, responsive to the execution pipeline indicating that the branch prediction was incorrect.

11. The microprocessor of claim 4, wherein the branch history field of each of the plurality of entries of the branch target memory is arranged as a shift register.

12. The microprocessor of claim 11, wherein the history update circuitry is also for shifting the branch history field of the entry in the branch target memory associated with an executed branching instruction by a number of bit positions corresponding to the count value, responsive to the execution pipeline indicating that the branch prediction was incorrect, so that the speculative predictions are eliminated therefrom and so that actual history bits are replaced thereinto.

13. The microprocessor of claim 12, wherein the history update circuitry is also for writing the most-recent bit of the branch history field of the entry in the branch target memory associated with an executed branching instruction, with an actual branch history bit corresponding to the execution of its associated branching instruction.

14. The microprocessor of claim 13, wherein the history update circuitry is also for resetting to zero the count value in the count field of an entry in the branch target memory associated with an executed branching instruction, responsive to the execution pipeline indicating that the branch prediction was incorrect.

15. The microprocessor of claim 1, wherein each entry of the branch target memory further comprises a target field for storing a target instruction for its associated branching instruction;

and wherein the fetch unit further comprises selection circuitry for selecting the target field of the selected entry as a next instruction address responsive to the prediction circuit generating a taken branch prediction.

16. The microprocessor of claim 15, wherein the fetch unit further comprises:

a fetch pointer for storing a next successive instruction address;

and wherein the selection circuitry is also for selecting the fetch pointer as the next instruction address responsive to the prediction circuit generating a not-taken branch prediction.

17. The microprocessor of claim 1, wherein the branch target memory further comprises:

at least one extended entry, having a tag field, an extended branch history field, and an extended count field, the extended branch history field having a larger number of bit positions than the number of bit positions in the branch history field of the plurality of entries, for storing actual branch history and speculative branch predictions for one of the associated branching instructions associated with one of the plurality of entries in the branch target memory.

18. A method of operating a pipelined microprocessor to speculatively execute branching instructions in a program of microprocessor instructions, comprising the steps of:

applying an instruction address to a branch target buffer, the branch target buffer having a plurality of entries, each having a tag field for storing an instruction identifier, having a branch history field for storing actual branch history and speculative branch predictions, and having a count field for storing a count value corresponding to the number of speculative branch predictions in its branch history field;

responsive to a portion of the applied instruction address matching the tag field of one of the plurality of entries, generating a branch prediction responsive to a most-recent portion of the branch history field of the matching entry;

storing the branch prediction in the branch history field of the matching entry; and adjusting, in a first direction, the count value in the count field of the matching entry.

19. The method of claim 18, wherein each of the plurality of entries of the branch target buffer further include a target field for storing a target instruction address;

and further comprising, responsive to the branch prediction corresponding to a taken branch:

fetching an instruction corresponding to the target instruction address in the target field of the matching entry.

20. The method of claim 19, further comprising, responsive to the branch prediction corresponding to a not-taken branch:

fetching an instruction corresponding to an address in a fetch pointer register.

21. The method of claim 18, further comprising:

executing an instruction corresponding to the applied instruction address, wherein the instruction is a conditional branching instruction and wherein the executing of the instruction determines whether the branch prediction was correct or incorrect; and responsive to the executing step determining that the branch prediction for the applied instruction address was correct, adjusting, in a second direction, the count value in the count field of the matching entry.

22. The method of claim 21, further comprising, responsive to the executing step determining that the branch prediction for the applied instruction address was incorrect:

eliminating speculative branch predictions from the branch history field of the matching entry;

updating the branch history field of the matching entry to reflect the result of the executing step; and resetting the count value in the count field of the matching entry.

23. The method of claim 21, wherein the generating, storing, adjusting, and executing steps are performed for a first instance of a first instruction address;

and further comprising:

prior to the executing step, repeating the applying, generating, storing, and adjusting steps for at least one additional instance of the first instruction address.

24. The method of claim 23, further comprising, responsive to the executing step determining that the branch prediction for the first instance of the first instruction address was incorrect:

eliminating branch predictions corresponding to the at least one additional instance of the first instruction address from the branch history field of the matching entry;

correcting a bit in the branch history field of the matching entry corresponding to the branch prediction of the first instance of the first instruction address to reflect the result of the executing step; and resetting the count value in the count field of the matching entry.

25. The method of claim 18, further comprising, responsive to a portion of the applied instruction address matching the tag field of one of the plurality of entries:

copying the portion of the applied instruction address to a tag field of an extended entry, the extended entry also having an extended branch history field for storing actual branch history and speculative branch predictions, the extended entry having a greater number of bit positions than the branch history field of the matching entry, and having an extended count field for storing a count value corresponding to the number of speculative branch predictions in its extended branch history field;

copying the branch history field of the matching entry to the extended branch history field;

storing the branch prediction in the extended branch history field; and adjusting, in a first direction, the count value in the extended count field.

26. The method of claim 25, wherein the generating, storing, and adjusting steps are performed for a first instance of a first instruction address;

and further comprising:

executing an instruction corresponding to the first instance of the first instruction address, wherein the instruction is a conditional branching instruction and wherein the executing of the instruction determines whether the branch prediction was correct or incorrect; and prior to the executing step, repeating the applying, generating, storing, and adjusting steps for at least one additional instance of the first instruction address.

27. The method of claim 26, further comprising, responsive to the executing step determining that the branch prediction for the first instance of the first instruction address was incorrect:

eliminating speculative branch predictions from the branch history field of the matching entry and from the extended branch history field of the extended entry;

updating the branch history field of the matching entry and the extended branch history field of the extended entry to reflect the result of the executing step;

resetting the count value in the count field of the matching entry and the count value in the extended count field of the extended entry; and copying actual branch history from the extended branch history field of the extended entry to the branch history field of the matching entry.

28. The method of claim 27, further comprising, responsive to the executing step determining that the branch prediction for the first instance of the first instruction address was incorrect:

eliminating branch predictions corresponding to the at least one additional instance of the first instruction address from the branch history field of the matching entry and from the extended branch history field of the extended entry;

writing a bit in the branch history field of the matching entry and in the extended branch history field of the extended entry corresponding to the branch prediction of the first instance of the first instruction address to reflect the result of the executing step; and resetting the count value in the count field of the matching entry and the count value in the extended count field of the extended entry.

* * * * *